June 2, 1970 — C. GURCHOT — 3,515,124

METHOD OF OBTAINING EXOCRINE SECRETIONS FROM LIVE ANIMALS

Filed July 24, 1967 — 2 Sheets-Sheet 1

INVENTOR.
CHARLES GURCHOT
BY Schapp & Hatch
ATTORNEYS

June 2, 1970 C. GURCHOT 3,515,124
METHOD OF OBTAINING EXOCRINE SECRETIONS FROM LIVE ANIMALS
Filed July 24, 1967 2 Sheets-Sheet 2

INVENTOR.
CHARLES GURCHOT
BY Schapp & Hatch
ATTORNEYS

United States Patent Office 3,515,124
Patented June 2, 1970

3,515,124
METHOD OF OBTAINING EXOCRINE SECRETIONS FROM LIVE ANIMALS
Charles Gurchot, 150 Palo Alto Ave.,
San Francisco, Calif. 94114
Filed July 24, 1967, Ser. No. 655,537
Int. Cl. A61b 17/00
U.S. Cl. 128—1    5 Claims

ABSTRACT OF THE DISCLOSURE

This invention relates to a method of obtaining exocrine secretions from live animals comprising the steps of taking a selected fraction of the output of the secretions of the glands from the animal while diverting a selected fraction of the output of the secretion to the animal for maintenance of life and good health; in its preferred form, the method includes installation of a diverting apparatus and a passage to the exterior of the animal whereby a selected fraction of the exocrine gland output flows through its normal channels while the fraction recovered is directed through a collecting device so as to maintain the life and health of the animal and provide a large continuous supply of exocrine secretion whereby the secretion itself and components thereof may be recovered.

BACKGROUND OF THE INVENTION

The present invention relates to improvements in a method of obtaining exocrine secretions from live animals, and more particularly relates to such a method where complete removal of the exocrine secretions would cause death or seriously impair the health of the live animal.

It is well known that exocrine glands produce various secretions containing enzymes and other useful components. For example, the enzymes may be utilized to catalyze certain reactions for industrial purposes, and may be used in therapy to treat both human and animal patients for shortages of enzymes, whether they are caused from natural causes or by removal of enzyme-producing organs through operations.

Certain of these enzymes are relatively easy to obtain because the juices from which they occur, such as gastric juice and salivary juice, are relatively easily obtainable and procedures for isolating enzymes from such juices are well known.

On the other hand, enzymes from other glands, such as the pancreas, are rather expensive, because these juices are usually taken from the pancreas itself removed from animals at a slaughterhouse or the like. For example, isolation of crystalline chymo-trypsinogen chymo-trypsin, trypsinogen, and trypsin inhibitor from fresh cattle pancreas is set forth in detail in the book entitled Crystalline Enzymes, by John H. Northrop, Moses Kunitz, and Roger M. Herriott, second edition, Columbia University Press, 1948. As indicated in Table 20 (page 99) and on pages 262, etc., these enzymes are characteristically prepared from fresh pancreas removed from cattle immediately after slaughter. While these procedures are eminently satisfactory for providing isolation of the desired enzymes, the amount of material is severely limited because of the limited amount of pancreatic juice present in the pancreas thus obtained. Similarly, materials normally flowing through the bile duct and seminal vesicle are also difficult to obtain in quantity.

SUMMARY OF THE INVENTION

In accordance with the present invention, a method is provided which is particularly suitable for the obtaining of juices, such as pancreatic juice, from live animals, where the animal would live only a limited time when deprived of the total flow of such juice, or its health would be seriously impaired by such procedure, comprising a procedure in which only a fraction of the pancreatic or other juice is taken from the live specimen, while the remainder is utilized to keep the animal alive and in comparatively good health. In this way, large quantities of heretofore rare enzymes are obtainable.

Although the procedure for obtaining exocrine secretions has been developed more particularly to the obtaining of exocrine secretions which are normally difficult to obtain in large quantities, it will also be appreciated that the procedure has advantage in obtaining exocrine secretions from glands in general. This is particularly true on the preferred procedures where a fraction of the secretion is diverted to the exterior of the animal and collected while the remainder of the secretion is allowed to flow through the normal path and approximate a normalcy as much as theoretically possible.

Accordingly, it is a primary object of the present invention to provide a method of obtaining exocrine secretions from live animals, in which the health of the live animal is maintained in substantially unimpaired condition, yet which provides rather high production yields of the desired exocrine fluids Another object of the invention is to provide a method of obtaining exocrine secretions from live animals, in which the exocrine secretions of the live animals which is not to be collected flows through its normal channels and provides a sufficient quantity of the secretion to maintain the life and health of the animal.

A further object of the invention is to provide a method of obtaining exocrine secretions of live animals in which comparatively large quantities of heretofore expensive secretions may be obtained at a relatively low cost.

Still another object of the invention is to provide a method of obtaining endocrine secretions from live animals in which certain pieces of apparatus are installed in the animal by surgery for providing a substantially automatic collection system and enable the tapping of the secretion to be made without seriously impairing the health of the animal.

Further objects and advantages of the invention will be apparent as the specification progresses, and the new and useful features of the method of obtaining exocrine secretions from live animals will be fully defined in the claims attached hereto.

In its broad aspect, the invention is applicable to most any animal having exocrine glands. However, it is generally preferred to utilize large animals, such as cattle, sheep, hogs, horses, carnivores such as dogs, rodents such as rabbits, certain cetaceans such as whales and dolphins, water buffalos, certain members of the camel family including South American members such as the alpaca. It will aso be appreciated that certain smaller animals will be applicable in certain situations, because the components of exocrine secretions tend to vary among different species and higher quantities of desired components are sometimes obtainable from smaller animals as a more practical matter. Accordingly, the particular animal utilized should be in no way limiting to the invention disclosed herein.

In general, any exocrine gland will fall within the scope of the invention, but it will be appreciated that the invention is particularly applicable to certain duct glands, the products of which have been heretofore difficult or impossible to obtain from live animals. Accordingly, the glands most applicable to the invention will be the pancreatic gland with the duct thereof being utilized, the liver and bile duct, and the intestinal gland. In the latter case, the entire intestine will be treated as a duct and certain of the material diverted from the small intestine while most of the material will be passed on through in the usual manner. Glands such as the prostate, seminal vesicles, salivary glands and stomach will also be within the broad scope of the invention, but are expected to be of diminishing importance in the order given.

Preferably, the material to be collected will be diverted from its natural flow by installing a diverter means in a duct of the endocrine gland at a position between the gland and the normal outlet thereof. The diverter means should be constructed to provide a fraction of the gland output to the animal through a normal duct outlet, and another fraction to the outside of the animal. Thus, where pancreatic juice is to be collected, the duct will be severed and the gland end of the duct sealingly fastened to the inlet of the diverter and the portion of the duct leading to its normal outlet sealed to one of a plurality of outlets of the diverter. The other outlet of the diverter is constructed to lead to the outside of the animal for collection and preferably to a collector device located either within or outside of the animal.

This method of attachment is also suitable for bile ducts and other discrete ducts. However, intestinal juices will be obtained by severing the intestine or at least slitting it sufficiently to insert the diverter therein to achieve the result of an inlet from a portion of the intestine and an outlet through the normal flow of the intestine together with another outlet leading to the exterior of the animal.

In general, the diverter can be constructed of any suitable material that will not be toxic or absorbable. In addition, it should be relatively non-irritating and not of the type capable of causing foreign-body immune reactions on the part of the animal. Within this general class of materials, glass can be used for the construction of the diverter and for internal containers. On the other hand, it is preferred to utilize Teflon tubing, and therefore, a Teflon diverter is also preferred.

The installation of the diverter is a surgical process wherein the diverter is sealingly attached to the tube ends (or placed therein as in the case of the intestine) and has an outlet leading to a Teflon tube which in turn will lead to a collecting device located under the skin or external of the animal. Where a duct is severed, it is found that it can be sealingly attached to the Teflon by slipping the end of the duct over the Teflon outlets and suturing the duct to the Teflon by a non-toxic, non-absorbable suture material of which several types are available on the market. Where the diverter is constructed of glass, it is preferred to provide a recessed end or an end beyond an enlarged ring over the glass as is typical in glass apparatus so that when the duct end is stretched thereover, it will remain in place. If desired, the duct end can be sutured to hold it from slipping back over the enlarged glass end.

The collecting means may be any suitable container capable of receiving fluid, such as a glass container suitably vented, or a flexible plastic bag such as the plastic bag utilized for collection of blood from blood donors, or a typical Stevenson bag. When the plastic bag is utilized, it will have the inlet duct coming into the bag and the flexible nature of the bag will allow the material to flow therein without venting. This bag is conveniently taped or strapped onto the flanks of the animal to protect it from the likelihood of physical injury. Where a glass or other rigid containers are utilized, vent means which are especially constructed to prevent contamination will be utilized to assure flow into the collecting device.

In some cases, it will be desirable to place the diverter within the animal in the place just under the skin and utilize the special diverter that will positively assure flow of fluid in split fractions. This device will be explained more fully hereinafter.

In general, the proportion of fluid retained will be sufficient to maintain the live animal in good, healthy condition, and thereby assure flow of the desired fluid over long periods of time. The proportion that may be taken will depend upon many factors, such as the fluid taken, the animal from which the fluid is taken, and in some cases the prior history of the animal. In other words, it is believed that the removal of the fraction of the fluid may stimulate further production and thereby allow a higher fraction to be taken without harm from the animal during future production operation.

The return of the fluid is preferably achieved by diverting the fluid back into the normal channel as explained above. However, it will be appreciated that the fluid or components thereof may also be returned to the animal by other means, such as by the use of an enteric pill or physical discharge directly into the desired area where possible. Thus in its broad form, any method of returning the fluid may be applied, and it will be appreciated that the material may be returned to the animal by more than one method operating simultaneously, if desired.

BRIEF DESCRIPTION OF THE DRAWINGS

The preferred form of apparatus utilized in the invention are shown in the accompanying drawings, forming a part of the description, in which.

While only the preferred apparatus forms utilized for carrying out the method of the invention are shown, it should be understood that various changes or modifications may be made within the scope of the claims attached hereto without departing from the spirit of the invention.

DESCRIPTION OF THE PREFERRED EMBODIMENTS

Figure 1:
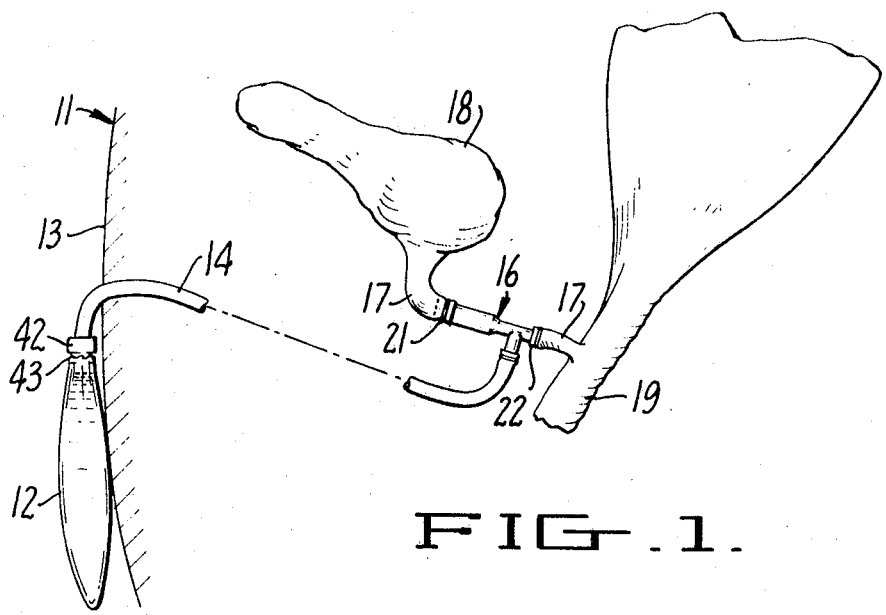
FIG. 1 is a schematic view illustrating the installation of an apparatus utilized in the method of this invention suitable for collecting pancreatic juice from cattle.
Figure 6:
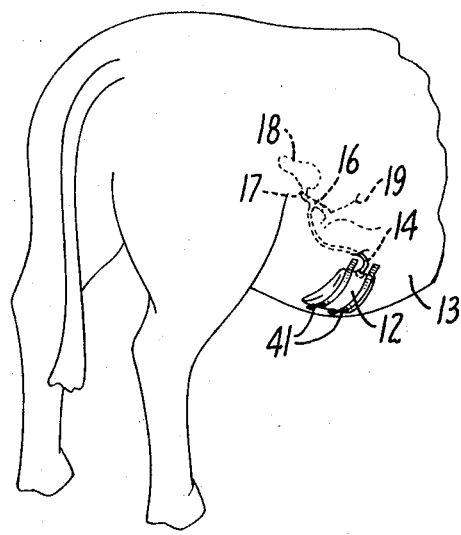
FIG. 6, a fragmentary view of an animal equipped with the system of FIGS. 1 and 2 showing an external collection device in the form of a plastic bag.

Referring more particularly to FIGS. 1 and 6, there is shown a steer 11 having a plastic bag 12 secured to a flank 13 thereof. The plastic bag 12 is sealingly connected to a piece of Teflon tubing 14 which is connected to a diverter 16, which in turn is installed in the duct 17 which extends between the pancreas 18 and the small intestine 19.

The diverter is installed by cutting an incision into the animal and severing the duct 17 so as to provide an end 21 on the cut portion leading to the pancreas and an end 22 on the cut portion leading to the small intestine. The diverter is placed through the incision and installed between the cut ends 21 and 22 as shown more clearly in FIG. 2 by telescoping the end 21 over the inlet 23 of diverter 16. In the form shown in FIG. 2, the diverter is constructed of glass and has a recessed ring portion 24 located at the end of inlet 23 thereof. The end 21 of duct 17 is passed over this recess and secured thereto by tying a suture 26 therearound. With this construction, a sealing attachment can be obtained which will remain in place.

Figure 2:
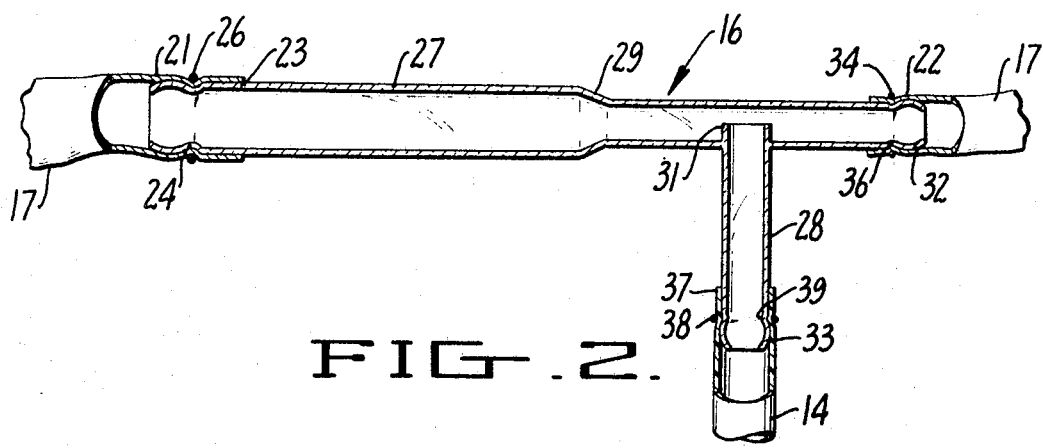
FIG. 2, an enlarged view of the diverter shown in FIG. 1 illustrating in greater detail the construction thereof.

As best seen in FIG. 2, the diverter is constructed with a main line or body portion 27 and a branch line 28, intersecting the main line near the outlet end thereof. As here shown, the main line 27 is tapered at 29 and the branch line 28 extends into the main line an excessive distance at 31. This construction allows for variation of the design of the diverter so as to control the fraction going through each of the two outlets 32 and 33.

The outlet 32 is installed into the end 22 of duct 17 by telescoping the end thereover and applying a suture 34 over the recess 36 of outlet 32. Similarly, Teflon tube 14 is attached by telescoping its end 37 over outlet 33 and applying the suture 38 at the recessed ring 39 thereof. After the diverter 16 and tube 14 are thus installed, the incision is closed in the usual manner and allowed to heal, but with the diverter means and tube 14 remaining in place.

A container 12 may be conveniently secured to the animal by any suitable fastening means 31 such as adhesive tape or straps with the fastening means placed so as to allow the plastic bag to expand and receive fluid. Control of the fluid may be effected by design of the particular diverter and outlet duct so as to assure sufficient normal flow to the small intestine. In addition, flow may be shut off by allowing the full bag to remain in place, or by pinching the tube or installing a valve at 42. In some cases, reverse flow of the fluid could be effected by compressing the bag 12 and forcing fluid back through the duct 14 if observation of the animal indicated such procedure would be desirable.

In the usual procedure, when the bag 12 is filled, it is detached from the tube 14 by operation of the detachable fitting 43 and another plastic bag put in place. In this way, a plurality of bags of fluid may be obtained by the simple expedience of changing the bags once the proper flow level is achieved.

Figure 3:
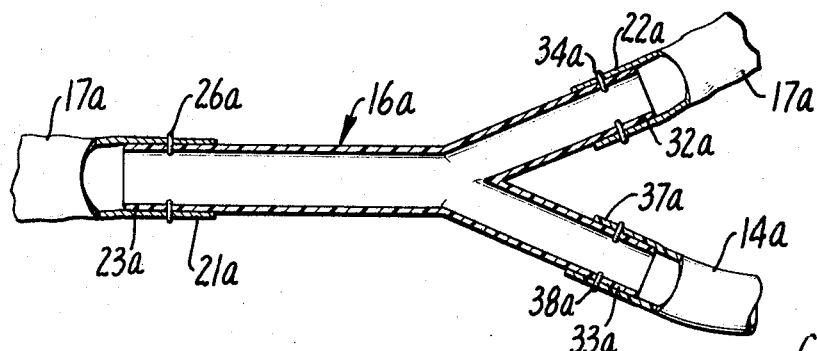
FIG. 3, an alternate form of diverter that may be utilized in place of the diverter shown in FIG. 2.

In FIG. 3, there is shown an alternate form of diverter 16a which is constructed of Teflon and has different geometry than the diverter shown in FIG. 2. However, it will be appreciated that the geometry of the diverter 16 shown in FIG. 2 could be made from Teflon material, or the geometry of the tube 16a could be constructed of glass. It will be noted that the recesses at the tube ends are not shown in the embodiment of FIG. 3, because it is not necessary when the tubing is made of Teflon.

Thus, it is seen that the installation shown in FIG. 3 illustrates the outlet duct 17a having its end 21a secured to inlet 23a of diverter 16a and fastened thereto by suture 26a. Similarly, the end 22a of duct 17a is secured to outlet 32a of diverter 16a by means of suture 34a. The Teflon tube 14a leading to the outside of the animal has its end 37a secured to outlet 33a by suture 38a. Otherwise, the installation utilizing diverter 16a is similar to the embodiment illustrated in FIGS. 1 through 6 and installed in the same manner.

Figure 4:
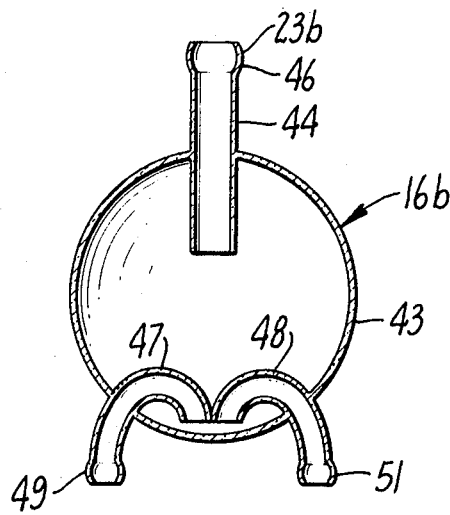
FIG. 4, still another alternate form of diverter which is especially constructed to assure flow of fluid, both back into the animal and to the exterior.

In FIG. 4, there is shown another form of diverter which is specially constructed to assure division of flow back to the live animal and to the outside. In this form, there is shown a diverter 16b having a main body 43. This body is spherical in shape and equipped with an inlet tube 44 at the upper end thereof having a glass inlet and 23b equipped with an enlarged end 46 constructed to receive the end of the Teflon tube. Outlets 47 and 48 have enlarged ends 49 and 51 so that Teflon tubes can be secured thereover and sutured in place, as described above.

Figure 5:
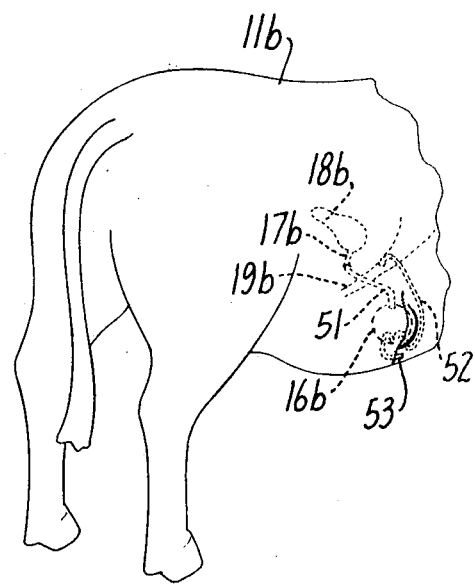
FIG. 5, a fragmentary view of an animal equipped with the system utilizing the placement of the diverter shown in FIG. 4.

Referring more particularly to FIG. 5, there is shown a steer 11b having pancreas 18b, and small intestine 19b, and duct 17b as described for the embodiment of FIG. 1. The duct 17b is severed and a Teflon tube 51 is placed between the duct portion 17b leading from the pancreas and the inlet 44 of diverter 16b. Similarly, a Teflon tube 52 is extended between the duct 17b leading to the small intestine and the outlet 47 of diverter 16b. The Teflon tubes 51 and 52 are secured by telescoping over the enlarged ends 46 and 49 of inlet 44 and outlet 47 respectively, and telescoping the other ends within the severed duct 17b at the mentioned location and suturing the duct to the Teflon tube.

The diverter 16b is placed between the skin layer and the muscular tissue of the steer by cutting and physically forcing it therebetween in position and providing a Teflon tube 53 leading to the outside to a suitable collecting device (not shown). With this construction, it is seen that only Teflon tubes 51 and 52 extend through the peritoneum into the internal portion of the animal thereby avoiding the placement of a diverter therein. In addition, it provides for the use of a larger and specially constructed diverter 16b having the siphons so that material must be collected into the diverter before it is removed therefrom. This provides for a control of flow through both outlets 47 and 48. The collection and secondary control of fluid may be achieved in a manner similar to that described above with reference to the embodiments of FIGS. 1 and 6.

While the forms specifically shown in the drawing are adapted for diverting pancreatic fluid while at the same time maintaining flow of the fraction thereof through its normal outlet, it will be appreciated that the systems shown are applicable to any duct as indicated above. In addition, it will be appreciated that diverters similar to the embodiment shown in FIG. 2 may be installed in larger tubes like the small intestine by making a slit therethrough and placing the entire main line 27 of the diverter within the intestine and having the branch line 28 extend through the slit. Other techniques will be apparent to those skilled in the art, and may be utilized to provide various changes depending upon the animal involved and the secretion to be produced by the method of the invention.

The amount of fluid that may be taken from the animal will vary considerably with the particular animal, and small amounts may be conveniently taken that are certain to leave sufficient secretions to maintain good health for the animal. However, larger secretions may be taken by careful observation of the animal and return of the material either back through the diverted outlet, or by other means such as enteric pill. In addition, it will be appreciated that certain components of the secretion may be isolated, and that certain of these components may be returned by enteric pill or otherwise so as to alter the composition of material received by the animal and possibly increase production.

The secretions thus collected may be utilized without further processing where the secretions themselves would be valuable. On the other hand, the secretions may be further processed to isolate enzymes and other components as explained in the book entitled Crystalline Enzymes, cited above. Further processing of this nature allows for the isolation of certain desired components, and in some cases, the remainder of the fluid may be rejected. In addition, it is believed that the present invention will allow for the production of larger quantities of certain secretions at lower cost, so that the additional uses of either the secretions themselves or components thereof will become economically feasible and provide the basis for additional development in this area.

From the foregoing, it is seen that I have provided an improved method for obtaining exocrine secretions from live animals which is particularly suitable for obtaining secretions which are essential to the life of the animal without seriously impairing its health and which provides for the production of large quantities of secretion.

I claim:

1. The method of obtaining pancreatic juice from living animals, which comprises the steps of operating on the animal and severing the duct located between the pancreas animal and the intestine, inserting a diverter means in said duct, said diverter means having a central chamber, an inlet duct, said outlet ducts being located in siphoning relationship within the chamber whereby removal of said juice therefrom can be controlled, said diverter means being two outlet ducts connected by said inlet duct to receive fluid in the central chamber thereof from the pancreas whereby pancreatic juice will flow from the pancreas through said diverter means to a plurality of places, said diverter means also being connected through one of said outlets to the duct connected to the intestine whereby a fraction of the pancreatic juice will flow into its normal position within the intestine, and bringing the other said outlet of said diverter means to the outside of the animal for removal of pancreatic juice therefrom said removal being carried out in a controlled fashion whereby sufficient juice is directed toward the intestine to maintain adequate receipt for assuring continued life of the animal.

2. A method of obtaining pancreatic secretions from living animals as defined in claim 1, in which a collecting device is provided on the outside of the animal for receipt of fluid from the other outlet.

3. A method of obtaining pancreatic secretions from living animals as defined in claim 2, in which the collection device is a flexible plastic bag.

4. The method of obtaining pancreatic secretions from living animals as defined in claim 3, in which the diverter means is positioned just under the skin layer of the animal.

5. A method of obtaining pancreatic secretions from living animals as defined in claim 1, which comprises the further steps of separating certain of the components of the pancreatic secretion obtained for isolation of individual factors thereof.

References Cited

UNITED STATES PATENTS

| 2,587,910 | 3/1952 | Shulman | 128—2 |
| 2,670,730 | 3/1954 | Kellogg | 128—2 |
| 2,815,025 | 12/1957 | Fenton et al. | 128—275 |
| 3,313,289 | 4/1967 | Kapral | 128—1 |

FOREIGN PATENTS

| 150,591 | 1962 | U.S.S.R. |
| 150,592 | 1962 | U.S.S.R. |

DALTON L. TRULUCK, Primary Examiner

U.S. Cl. X.R.
128—2, 275, 348